Patented May 5, 1936

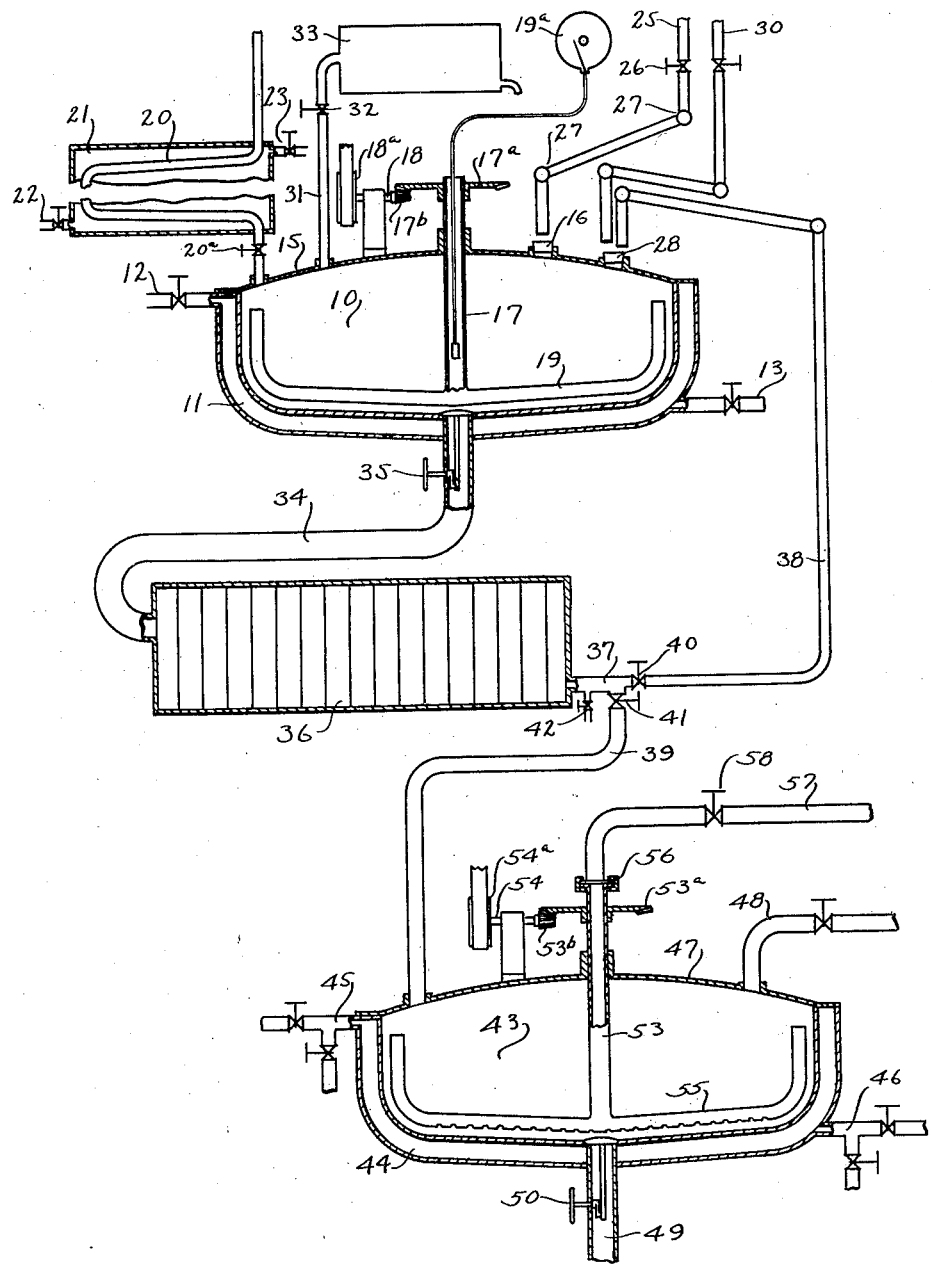

2,039,365

UNITED STATES PATENT OFFICE 2,039,365

PROTECTIVE COATING MATERIAL

Charles A. Thomas, Dayton, Ohio, assignor, by mesne assignments, to Monsanto Petroleum Chemicals, Inc., Dayton, Ohio, a corporation of Delaware Application February 25, 1931, Serial No. 518,132

18 Claims. (Cl. 134—26)

This invention relates to the manufacture of artificial or prepared resins, and to protective coating materials, such as paint, varnish, and the like, made from such resins.

One of the principal objects of this invention is to provide a prepared resin of superior character and definitely controlled characteristics, and a method of producing such a resin.

Another object of this invention is to provide such a prepared resin which has markedly superior characteristics in certain respects, particularly with regard to its reactivity, degree of unsaturation, and other properties which make it especially valuable for protective coatings where unusual resistance is desired.

Another object of this invention is to produce a synthetic resin of this character which is readily soluble in a paint or varnish solvent, and which on drying becomes relatively insoluble in such solvent.

Another object of this invention is to provide a protective coating material having unusually good qualities, with respect to insolubility of the film produced therefrom, resistance to water, alkalies, etc., and which is relatively economical to manufacture.

Another object of this invention is to provide a protective coating material made from an unsaturated synthetic resin of this character which is readily soluble in cheap solvents and gives a dried film relatively insoluble in such solvents and impervious to water.

Still another object of the invention is to provide apparatus for carrying out the above methods and for producing the above products.

Other objects and advantages of the invention will be apparent from the following description when taken in connection with the accompanying drawing and appended claims.

The single view of the drawing is a diagrammatical representation of apparatus for practising the method and for producing the resin-like material of the present invention.

In the practising of this invention unsaturated hydrocarbon compounds are caused to react in the presence of a suitable catalyst or activating agent, such as anhydrous aluminum chloride, to produce by polymerization an amorphous resinous reaction product, of high molecular weight.

Reference is herein made to the copending application of Charles A. Thomas, Serial No. 461,807, filed June 17, 1930; Charles A. Thomas and Carroll A. Hochwalt, Serial No. 294,491, filed July 21, 1928 now Patent No. 1,836,629; Carroll A. Hochwalt, Serial No. 461,799, filed June 17, 1930, and Charles A. Thomas, Serial No. 482,157 filed September 15, 1930 now Patent No. 1,947,626 which disclose resins of this general character and methods of making the same, reference is also made to my co-pending application Serial No. 494,692, filed Nov. 10, 1930. In carrying out this invention, unsaturated hydrocarbon compounds from various sources may be used. Relatively pure hydrocarbon compounds, such as diolefines and olefines, diolefines and substituted benzenes, or mixtures of these, may be reacted together in controlled proportions to produce resins of predetermined characteristics. Indeterminate mixtures of unsaturated hydrocarbons may also be reacted in this manner. Thus cracked distillate, or special fractions of cracked distillate, may be used. Very satisfactory results have been secured by using a mixture of unsaturated hydrocarbons included in the fraction of cracked distillate distilling between 30° C. and 160° C. This fraction has been found to comprise in varying proportions, olefines and diolefines such as isoprene and amylene and their homologues; cyclic olefines and diolefines such as cyclo-hexadiene, cyclo-hexene, methyl cyclo-hexadiene, and their homologues; and substituted benzenes, such as toluene and xylene.

As an example of the carrying of this invention into effect, the following procedure is described, using the fraction of cracked distillate specified above. This mixture of unsaturated hydrocarbons is placed within a container or polymerizing and neutralizing vessel 10, which is in turn inclosed within a suitable jacket 11, having valve controlled inlet and outlet connections 12 and 13 for the supplying of water or steam to jacket 11 for controlling the temperature of the mass within the container. A cover 15 is fastened in gas-tight manner on the upper end of the vessel, and the cover is provided with a filling opening normally closed by the plug 16, through which material may be supplied to the interior. Cover 15 supports in suitable bearings a hollow shaft 17 carrying at its upper end a gear 17ª meshing with a pinion 17ᵇ on a drive shaft 18 carrying a pulley 18ª, adapted to be belt driven by a steam turbine, motor, or other suitable driving means, not shown. Steam driving machinery is preferably used to guard against sparks such as may be produced with electrical machinery. Hollow shaft 17, which projects downwardly into the vessel 10, carries at its lower end a suitable hollow stirrer or agitator 19, preferably of the anchor type as shown, arranged to effectively scrape material from the side and bottom walls of the vessel. This hollow agitator or stirrer is adapted to contain a suitable oil and is connected by cable with a recording thermometer 19ᵃ for determining and recording temperatures during the reaction. Leading off from the top of vessel 10 is a reflux condenser coil 20, positioned within a suitable cooling jacket 21, to which cooling liquor may be introduced through the valve controlled inlet 22, and discharged through the valve controlled outlet 23. The upper end of the condenser coil is open to atmosphere as the purpose of it is to condense and return to the container 10, any vapors that may be generated during the reaction. A valve 20ᵃ is provided in the pipe leading to the condenser coil 20.

The unsaturated hydrocarbon compounds are fed into the container 10 through a pipe 25 controlled by valve 26 leading from a suitable source of supply, pipe 25 being removably connected to the opening normally closed by plug 16 and being supplied with a flexible or swivel connection 27 so that it can be swung out of the way after the material has been supplied. The activating compound, such as powdered anhydrous aluminum chloride ($AlCl_3$), is added to the unsaturated hydrocarbons through the opening normally closed by plug 28. The aluminum chloride is preferably pulverized to give better contact. This material is also added in small quantities at a time while the contents of the container 10 are being agitated by the belt actuated stirrer 19. For example, presuming that 25 gallons of a mixture of unsaturated hydrocarbons are to be treated within container 10, aluminum chloride may be satisfactorily added in quantities of approximately 6 to 8 ounces at a time. With the addition of the first batch of aluminum chloride, there is a rather active chemical reaction with a resultant rise in temperature. It is desirable to control the temperature of the reacting mass inasmuch as this has a bearing upon the character of the resultant resin, particularly the hardness thereof. The reaction is preferably carried out above 20° C., as then the resultant resin is very materially harder and the yield is somewhat greater than when the reaction is carried out below 20° C. in the same interval of time. However, it is desirable where an atmospheric polymerizing vessel is used that the temperature should not be permitted to rise much above 40° C. Otherwise the polymerizing vessel should be kept under pressure to prevent undue volatilization and loss of hydrocarbons which will form resins. Polymerization at higher temperatures, such as above 65° C., requires a special pressure vessel. Very satisfactory results are secured when the temperature is controlled between 25° and 35° C., this being readily accomplished by introducing the aluminum chloride in small amounts with proper agitation to prevent local overheating and by supplying cooling liquid to the cooling jacket 11. This polymerizing reaction is preferably carried out in the absence of water. Any water present during this reaction hydrolyzes the catalyst to form an acid which in turn affects the reaction, resulting in a darker and quite different resin product.

Additional batches of aluminum chloride are added from time to time as may be done without unduly increasing the temperature within container 10, and this addition is repeated with continuous agitation until the desired amount of catalyst has been added. The amount of aluminum chloride used is found to have a bearing upon the yield, and to materially affect the characteristics of the resin produced, such as iodine value, color, hardness and ease of oxidation. It has been found that the effectiveness of the catalyst appears to be proportional to the amount which goes into solution in the reaction mixture. As in effecting all solutions, the speed of agitation during polymerization has a definite relation to the rate of solution of catalyst. Since it is found that the resin is darkened by long contact with the catalyst, it is important that solution be effected as soon as possible. It is also found that the iodine number of the resin decreases as the amount of catalyst used increases. The amount of catalyst used means effective catalyst, that is, as stated above, the amount of catalyst added is increased or decreased to produce the desired result. For example, to produce a resin having iodine number of more than 175, when 750 gallons of hydrocarbons are being polymerized, not more than 0.5 g. of catalyst for 100 cc. of unsaturated hydrocarbons will usually be required. However, the amount required will vary somewhat according to the nature of the materials used, the volume of mix, speed of agitation, etc. For example, the following table indicates amount of catalyst required to produce resins having varying iodine numbers, 750 gallon batches being polymerized, using the fraction of cracked distillate distilling between 30° C. and 160° C., and speed of agitation being about 22 R. P. M.

| No. | Catalyst g./100 cc. | Yield g. 100 cc. | Iodine No. (not steamed) | Iodine No. (steamed) |
|---|---|---|---|---|
| 1 | 0.141 | 0.7 | 227 | 219.6 |
| 2 | 0.382 | 1.04 | 196 | 201.7 |
| 3 | 0.573 | 1.5 | 170 | 163.6 |
| 4 | 0.764 | 1.93 | 159 | 156.3 |
| 5 | 0.955 | 2.06 | 150 | 149.3 |
| 6 | 1.146 | 2.20 | 146 | 145.6 |
| 7 | 1.353 | 2.16 | 146 | 143.0 |

The quantity of catalyst needed for desired results as to yield and iodine number can be readily determined by tests for the particular ingredients being treated and the production conditions in use, so that amount can be used in regular plant production.

In addition to aluminum chloride, other compounds which hydrolyze in water giving an acid reaction will function satisfactorily to cause the conversion of the unsaturated hydrocarbons into resin, for example, chlorides of iron, boron, zinc, antimony, indium, titanium, tin, ethyl sulfate, and aniline hydrobromide. The reaction may proceed as much as twelve hours, but it is found desirable not to leave the catalyst in contact with the materials for a period of time much in excess of this, as the resin may be darkened. From the above table it will be apparent that the yields of resin do not continue to increase in a straight line function with the amount of catalyst added. At a certain point the yields as well as the iodine number appear to become constant. It is also found that the density of the polymerized product at this point becomes constant, and that the addition of more catalyst does not increase the specific gravity of the polymerized mass. It may be that the reason the reaction does not proceed beyond this point, is that at that point the mixture is saturated with catalyst. If this is true, since the yield and iodine value are proportional to the amount of catalyst in solution, and since no more solution can be effected at the given temperature, the reaction stops at this point. When a resin of high iodine value is desired, however, the reaction is stopped at the desired point, after the addition of the desired amount of catalyst.

The resulting reaction product is a viscous mass dark in color. This viscous material is then neutralized to terminate or kill the polymerizing reaction. Various water soluble alkalies may be used for this neutralizing, but preferably ammonia is employed as the excess of this material can subsequently be removed by distillation and it has no injurious effects upon the resulting resin. The neutralizing treatment is preferably carried out in the presence of an organic hydroxy compound which is effective to supply hydroxyl radicals for the decomposition and precipitation of the aluminum chloride or other activating agent present. An alcohol, such as ethyl alcohol, functions very satisfactorily for this purpose. Thus a mixture of about 40% by volume of ammonium hydroxide containing 28% $NH_3$ by weight, and 60% by volume of 95% ethyl alcohol gives good results. With the quantities specified above, 25 gallons of unsaturated hydrocarbons, slightly more than 3 gallons of this mixture is used, the amount theoretically required being approximately 3.2 gallons of the above mixture. The mass is agitated constantly during the neutralization and a granular precipitate of the activating agent is produced which is readily removed by filtration—for example where aluminum chloride is used a precipitate of aluminum hydroxide is formed. The neutralization is accompanied by a color change, the reacting mass changing from a black or dark red to a yellowish red as the neutralization is completed. The neutralizing reaction is completed in about a half hour. The polymerized mass is continuously agitated by stirrer 19 during the addition of the neutralizing agent and during the neutralizing reaction within vessel 10. A valve controlled pipe 30 leading from a suitable reservoir or source of supply may be used to supply neutralizing liquid, and may be removably connected in any suitable manner to the opening normally closed by plug 28.

After the neutralizing reaction is completed the contents of vessel 10 are preferably heated with steam or hot water by jacket 11 to a temperature of about 60° C.–100° C., or until the distillate comes over clear. That is, the distillation is continued until no more water comes over. For the amounts specified, this operation is continued from one to two hours. During this heating reaction valve 20ª is closed, shutting off the reflux condenser, and substantially all of the excess ammonia and alcohol are liberated and pass through the distillate offtake 31 having a control valve 32 to a suitable condenser 33 for the recovery of the distillate. In this process it is found desirable that substantially all of the water, ethyl alcohol and $NH_3$ be removed to prevent precipitation of the resin and consequent clogging of the filter.

If the resin is to be used in a varnish it is exceedingly important that all of the water, alcohol and ammonia are removed by heating, because if a small amount of ammonium chloride formed in the neutralization is held in solution in the resin hydrocarbon mix by the presence of water and alcohol, then when the resin is hardened the ammonium chloride will be occluded in the hard gum. When such gum is used with drying oils such as linseed, China wood etc., it reacts with the oils to darken them and also makes the varnish less durable.

When the neutralization is carried on in the presence of water as described above, the subsequent distillation is more difficult and water may be occluded in the resin, resulting in an opaque product. Where a clear resin is essential, or for more convenient plant operation, it may be desirable to carry out the neutralizing operation in the absence of water. In such case an anhydrous alcohol or other organic hydroxy liquid saturated with dry $NH_3$ gas can be used for the neutralization with very satisfactory results. When no aqueous solutions have been used, the above distillation can be carried out in less time than specified above.

When reacting unsaturated hydrocarbons in this manner, it is found that two products are formed, one being an amorphous resin compound readily soluble in benzol, and another being a gelatinous compound insoluble in such solvents. This insoluble compound is carried down in the precipitate. In order to insure complete solution of the resinous product and to facilitate the filtering operation, an organic solvent which is immiscible with water, such as benzol, is added to the neutralized mass after free water and ammonia have been distilled off. In the distillation process approximately one-half the volume of the original reaction mixture used is usually distilled off. The amount of solvent added is then approximately equal to the volume distilled off; that is, for the quantities specified about 12 gallons of benzol are added to the neutralized and distilled mass.

The neutralized mass mixed with the solvent is then passed by discharge pipe 34 having a control valve 35 to a suitable filter, such as a conventional filter press 36, where the undissolved materials including the precipitated activating agent are removed from the liquid. Valve 35 is shown as a poppet valve, the top of which is flush with the bottom of vessel 10 to avoid the formation of an accumulating pocket. It has been found that when a pocket type valve is used at this point, portions of the solid catalyzer may settle and remain in contact with the reaction product for a long time and this is apt to cause a discoloration of the resultant resin.

The filtered sludge removed in the filter press 36 is preferably treated to recover aluminum oxide ($Al_2O_3$) and ammonium chloride ($NH_4Cl$) as by-products. In place of the filter press shown a suitable type of a centrifuge may be used if desired.

The filtrate containing the resin in solution from filter 36 passes through an outlet pipe 37 which is connected by a T coupling to pipes 38 and 39 having control valves 40 and 41 respectively. A suitable sampling valve 42 is provided to permit testing the degree of filtration. When the filtrate is found not to be sufficiently clear, it is passed through pipe 38 back into polymerizing vessel 10, valve 41 being closed. When the filtrate is found to be substantially clear, valve 40 is closed and valve 41 opened to allow the filtrate to pass through pipe 39 into the distillation vessel 43. Vessel 43 is provided with an external heating jacket 44 provided with valve controlled inlet and outlet connections 45 and 46 respectively for the introduction of a suitable heating medium such as steam or oil. The vessel also has a tight fitting cover 47 carrying a distillate offtake pipe 48 communicating with a suitable condenser (not shown). Steam is admitted to jacket 44 to distill off the more volatile constituents, including the benzol, which pass off through the offtake 48 and are condensed and may be recovered for repeated use in the process. Distillation is continued until a thermometer in the distillation line rises to approximately 100° C., at which time substantially all of the benzol will have been driven off of the resulting resin which is left in the vessel 43 as a semi-fluid or pasty mass, termed herein a "soft resin". This soft resin also contains varying proportions of higher oils, primarily unsaturated hydrocarbon oils of rather high molecular weight, which are not removed by distillation at temperatures not exceeding 100° C.

If desired, the concentration of the resin may be controlled so as to leave a calculated amount of solvent in the resin so that it is maintained in solution form. This solution may then be withdrawn through the discharge pipe 49 having control valve 50 to a convenient place of storage, the valve 50 preferably being of the type of the valve 35 and being flush with the bottom of vessel 43. This resin in solution form in benzol, or other solvent such as solvent naphtha, may be used directly in the paint and varnish industries, or for other suitable uses without concentrating to dryness. If a solid or "hard resin" is desired, the distillation is continued as described above until substantially all of the readily volatile solvents have been driven off. Cover 47 rotatably supports a hollow shaft 53 having a gear 53ª meshing with a pinion 53ᵇ on a drive shaft 54 carrying a pulley 54ª adapted to be belt driven, by a steam turbine, or a motor (not shown.) Hollow shaft 53 projects downwardly into the vessel 43 and carries at its lower end a suitable hollow stirrer or agitator 55 of the type of the stirrer 19 described above. This hollow agitator or stirrer is connected through a suitable coupling 56 to a pipe 57 having control valve 58 and connected with a suitable source of supply of fluid under pressure. The hollow agitator 55 is provided throughout the extent of its lower surface with a plurality of perforations 59 which are preferably very fine, so that the gas supplied to vessel 43 therethrough is finely dispersed. At the same time a heating medium may be introduced into jacket 44, and the temperature of the mass raised to a controlled higher temperature.

It is found that where a gas such as air, is passed through the resinous mass, and the mass is kept agitated, the heating jacket may be raised to a materially higher temperature with a resultant rapid increase in the drying and hardening of the resin without injury to the resin. Thus, oil heated at a temperature of about 180° C. may be supplied to this external jacket. This treatment drives off any remaining solvent and higher oils present in the resin which tend to make it soft.

By avoiding the use of steam or substantial quantities of water throughout the drying process, the occlusion of water in the resin is avoided and a clear product obtained. But steam distillation may be advantageously used if the occluded $H_2O$ makes no difference in the product, that is, when a clear resin is not desired. Means may also be used to free this occluded $H_2O$ from the hardened resin, by reheating and melting the resin and boiling off the water, when it is desired to use steam distillation in hardening the resin.

When the hardening process has been carried to the desired degree, the resin is removed from vessel 43, as by the bottom outlet 49, and placed in suitable collecting troughs or shallow pans where it is allowed to cool and harden. While a gravity feed from one vessel to the other is shown herein, it is to be understood that a pumping system may be used where desired, as for higher capacities.

The resin so prepared in accordance with this invention is found to have a yellow shading to amber color, and is very clear. It has been found that the unoxidized resin has a molecular weight of about 700–1400. It is found that resins produced in this manner from pure olefines and diolefines, conform to the empirical formula $(C_nH_{2n-2})_x$. Analyses of resins produced from mixtures of unsaturated hydrocarbons, such as the above specified fraction of cracked distillate, indicate that such resins are mixtures of resins conforming to the above formula and to the formula $(C_nH_{2n-4})_x$, and even to the formula $(C_nH_{2n-6})_x$. It is believed that resins poorer in hydrogen, such as resins conforming to the empirical formulas $(C_nH_{2n-4})_x$ and $(C_nH_{2n-6})_x$, combine more readily with drying oils in the manner hereinafter described. It has been found that these resins when unoxidized or partially oxidized have the peculiar property of reacting in the manner of a so-called drying oil, such as linseed oil, China-wood oil, and the like. That is, the resin apparently undergoes an oxidation and polymerization reaction on drying in an oxygen containing atmosphere.

This resin when freshly manufactured according to the method herein described, and not oxidized, but instead dried with a nonoxidizing gas, is substantially neutral in reaction, and is readily soluble in organic solvents, such as paint or varnish solvents.

The iodine value of this resin may be controlled by regulating the amount of catalyst as above described, and resins having unusually high iodine value, that is about 175–225, may readily be produced.

It is found that in general resins of this character having higher iodine value form films which on drying have greater insolubility in organic solvents, such as hydrocarbon solvents, than resins having lower iodine values. Thus where it is desired to produce a resin for a coating film in which a high degree of insolubility of the dried film in such solvents is a requisite, the reaction is controlled in the manner described above, to produce such high iodine value resins, for example, a resin having iodine value of 175 or higher. On the other hand, when the unusual degree of insolubility of the coating film in such solvents is not a requisite, it may be preferred to carry out the resin forming reactions with a larger amount of catalyst relative to the amount of starting material, in the manner described to produce optimum yield of the grade of resin desired, which in such case will have lower iodine value.

When a resin produced in this manner and having iodine value of more than 175, is dried in a thin film, either by pouring out the molten resin to harden in a thin layer, or by dissolving the solidified resin in a solvent, brushing it on a surface and allowing the solvent to evaporate, the film so produced on aging becomes increasingly insoluble in gasoline. When a solution in a coating solvent of such a resin of high iodine value is brushed on a surface and the film dried at 120° C. for one hour, such film will remain unaffected on immersion in gasoline for a period of at least one hour. The insolubility of the resin in such solvent is found to increase on somewhat longer aging. During this aging process, or during the baking of the films formed from the resin, the resin reacts in the manner of a so-called drying oil. Thus on drying in this manner, such resin is found to exhibit a progressively decreasing iodine number, indicating a change from a more saturated to a less saturated resinous product, a progressively increasing acid value, indicating an increase in COOH groups attributable to oxidation, and an increase in molecular weight above that which would be induced merely by the unsaturated resin taking on oxygen, and which may be accounted for by polymerization. This aging reaction on air drying of course, is relatively slow. The soft resin, or resin containing a proportion of unsaturated compounds or oils also produced during the resin forming reaction, exhibits these properties, and resembles in characteristics a "bodied" drying oil, that is, a drying oil which has been subjected to the usual treatment in the paint or varnish industry to body it. This mixture of resin and higher oils is readily soluble in paint and varnish solvents, and may be used directly with such solvents to form a satisfactory protective coating or varnish without the addition of a usual drying oil, and without carrying out the bodying treatment which is generally practiced when a drying oil is used.

When a solution of such resin having iodine value above 175, in a paint or varnish solvent is brushed on a surface and the resulting film dried at 120° C. for one hour, such film is relatively insoluble in such solvent. That is, the film remains unsoftened on immersion in gasoline for a period of at least one hour. Such a film is equally insoluble in gasoline after drying at room temperature for several days.

It is found that resins having high iodine values are characterized by greater ease of oxidation, and more readily form such insoluble films. This may be due to the greater reactivity of such resins of a high degree of unsaturation. Consequently such unsaturated resins are particularly adapted for use in coating materials, where films of great insolubility are required, and where such insoluble stage must be quickly and readily obtained. Films produced from coating compounds made from resins having lower iodine values, by long aging or oxidation may reach a comparable degree of insolubility. However, it is found that for practical use in such coating materials, for production of films having a high degree of insolubility, resins having iodine values of 175 or more are desirable.

It has been found that certain resins produced in this manner have the unusual property of combining or reacting with drying oils, such as linseed oil, China-wood oil, etc., and that this reaction product makes a very superior coating material. Generally, but not invariably, resins having the higher iodine values have been found more reactive with respect to reactions of this character with drying oils. In making this coating material a resin which is determined by test to be reactive with drying oil, is placed with the desired drying oil, or combination of oils, in weighed amounts determined by the type of coating material desired, in a suitable vessel and heated to a reacting temperature. Satisfactory results in practical operations have been secured by controlling the temperature between about 280° C. and 320° C. The heating is continued until the combination of oil or oils and resin have acquired a satisfactory "body" or degree of consistency. This is judged by the appearance and by other characteristics and tests generally employed in the bodying step in varnish making. For a mixture of about 100 g. about one hour is required for heating, when the usual "body" is desired; but the exact time of heating will vary with the volume of the mix and the consistency desired. The properly heated mixture is allowed to cool, then thinned with a varnish thinner such as mineral spirits, to obtain the desired viscosity. Instead of varnish thinners, cheap thinners, such as gasoline or naphtha, may be used, as this resin, as well as the reaction product of this resin and oil, have the unusual property of being sufficiently soluble in relatively cheap solvents, such as gasoline or naphtha, to produce a coating material or varnish of proper consistency for application as a protective coating.

For example, to produce a varnish for interior surface finish, such a resin which reacts in this manner with the drying oil, such as a resin having iodine value of 180, and acid value of 1.2, was used in the following formula:

|  | Grams |
|---|---|
| Resin | 500 |
| China-wood oil | 400 |
| Perilla oil | 200 |

This mixture was heated to about 290° C., then the temperature was dropped to about 260° C. and held at that temperature for about one-fourth hour, for completion of the reaction and bodying process. This material was used with a metallic drier, in the proportion of about 0.08% by weight of lead based on weight of varnish and 0.005% by weight of manganese, the manganese and lead being in the form of resinates or linoleates. As stated above, suitable varnish thinners were added, as for example, mineral spirits, to obtain the desired viscosity.

When desired, pigments are added to this reaction product of resin and oil. In such case, the reaction product and pigment in the desired proportions are mixed in a mechanical mixer or by other suitable means, and the thoroughly mixed materials are then ground together in a buhrstone mill or other suitable type of mill. Because of the highly unsaturated quality of this resin, when using pigments comprising iron oxide, it is found desirable to grind such pigments in a closed container such as a pebble mill, out of contact with air. In such manner, reaction of pigment with the resin product may be prevented. In ordinary practice, temperatures of the mixture during grinding are generally controlled below about 70° C. to prevent undesired reaction, or vaporization of the thinner when present. The time required for grinding depends on the fineness desired and the type of mill used. Materials to be used for finishing are usually relatively fine. When the desired degree of fineness is reached, the material is removed from the mill in the form of a paste. To this paste, more of the thinned reaction product of resin and drying oil may be added, and additional thinner if desired, to give the desired consistency for use. When the coating is to be air dried, the drying may be greatly expedited by the use of metallic driers, such as cobalt or manganese resinate or linoleate. Other metallic driers such as copper, vanadium or cerium resinates or linoleates may be used.

The coating material described, with or without pigments or metallic driers, and using a usual paint or varnish solvent or a relatively cheap thinner, such as gasoline, produces a film which, when baked at 120° C. for one hour, is relatively insoluble in gasoline and paint and varnish solvents. That is, the film remains unaffected by immersion in gasoline or other organic solvents for one hour or longer. When the film is air dried at room temperature for several days, it likewise becomes relatively insoluble in gasoline and other organic solvents in the manner described above. The film thus formed is also impervious to water and very resistant to acids and alkalies.

The dried film produced from this coating material made from a reaction product of the described resin with a drying oil, has also the very desirable property of high elasticity or flexibility. That is, the film will withstand a high degree of stress and shock without cracking, peeling, chipping or otherwise being injured. This property of high flexibility characterizes the novel reaction product of the described resin with a drying oil.

The combination of these desirable characteristics, together with its ready solubility in cheap solvents, such as gasoline or mineral spirits, and its relatively economical method of manufacture, render this coating material particularly valuable for use on surfaces where a high degree of resistance to gasoline is required. For example, it is especially valuable for use as a coating for parts of automobiles where coatings known as "chassis black" have heretofore been used.

In manufacturing a resin for use in making this type of coating material, the resin reaction product is subjected to a controlled process, as described above so that the resultant resin has approximately a predetermined iodine value, and is readily soluble in paint or varnish solvent, or cheap solvents, but on drying the resultant film becomes relatively insoluble in such solution. For example, the following type formula has been used with very satisfactory results to produce a coating material particularly suitable for use as a chassis black for automobiles, or for other surfaces apt to be exposed to gasoline and similar organic solvents:

| | Percent by weight |
|---|---|
| Resin | 50 |
| China-wood oil | 30 |
| Standard gasoline | 20 |

In making a coating material according to this formula, very satisfactory results were obtained by using a resin having, by way of example, an acid value of about 1.6 iodine value of about 175, and molecular weight of approximately 700. This resin was heated with China-wood oil in the proportions indicated above. When the mixture had reached approximately 310° C. which required in this case approximately 45 minutes, the reaction mixture was found to have a satisfactory body. After cooling, this mixture was thinned with standard gasoline, approximately the proportions given above being used to give the desired viscosity. This material was used with a metallic drier, 5% by weight being added of a manganese solution consisting of one part by weight of manganese resinate to ten parts by weight of turpentine. A pigment was also used with this material, about 3% by weight of carbon black being added to the above composition. Other pigments may be used if desired.

The resin produced as herein described may also be used with good results as a protective coating material without combination with a drying oil. The described resin may be used in any paint or varnish solvent such as turpentine or mineral spirits, or in a relatively cheap solvent, such as gasoline, roughly in the proportions of 50% of each, the porportions varying with the degree of viscosity desired. Any desired pigments or metallic driers may be used with this material in the same manner and proportions as they are used in ordinary coating materials. Such a solution of the high iodine value resin in a solvent, when brushed onto a surface, and baked at 120° C. for one hour, or air dried for several days, produces a film which is relatively insoluble in gasoline and other organic solvents. That is, the dried film is unaffected by immersion in gasoline for one hour or more. The film thus produced is also impervious to water and resistant to alkalies and acids. These properties render this coating material valuable for use on surfaces where a high degree of resistance to gasoline and water is required, and where a highly flexible coating is not necessary.

It has been found that the coating material of this invention provides a markedly superior protective coating, which effectively combines the most desirable characteristics essential to such materials, and which is substantially free from undesirable qualities.

While the features herein described constitute preferred embodiments of my invention it is to be understood that the invention is not limited to those precise features, and that changes may be made therein without departing from the scope of the invention which is defined in the appended claims.

What is claimed is:

1. A protective coating material comprising a synthetic hydrocarbon resin formed from cracked petroleum distillate, the resin having an iodine value of at least approximately 175, being substantially completely soluble in benzol and gasoline, and substantially completely insoluble in alcohol and acetone.

2. A protective coating material comprising the reaction product of a drying oil with a synthetic hydrocarbon resin formed from cracked petroleum distillate, the resin having an iodine value of at least approximately 175, being substantially completely soluble in benzol and gasoline, and substantially completely insoluble in alcohol and acetone.

3. In the manufacture of a coating material comprising an unsaturated synthetic hydrocarbon resin, the method which comprises reacting together unsaturated hydrocarbons to produce an unsaturated hydrocarbon polymerization resin having an iodine value of at least approximately 175, and combining said unsaturated hydrocarbon polymerization resin with a drying oil to produce a coating material.

4. In the manufacture of a coating material comprising an unsaturated hydrocarbon resin, the method which comprises reacting together unsaturated hydrocarbons in the presence of a metallic halide catalyst added in chemically uncombined form, in a proportion not greater than approximately 0.5 gram of catalyst per 100 cc. of unsaturated hydrocarbons, to produce an unsaturated hydrocarbon polymerization resin having an iodine value of at least approximately 175, and combining said polymerization resin with a drying oil to produce a coating material.

5. A protective coating material comprising a synthetic hydrocarbon resin formed from cracked petroleum distillate in the presence of a metallic halide catalyst, the resin having an iodine value of at least approximately 175, being substantially completely soluble in benzol and gasoline, and substantially completely insoluble in alcohol and acetone.

6. A protective coating material comprising the reaction product of a drying oil with a synthetic hydrocarbon resin formed from cracked petroleum distillate in the presence of a metallic halide catalyst, the resin having an iodine value of at least approximately 175, being substantially completely soluble in benzol and gasoline, and substantially completely insoluble in alcohol and acetone.

7. A protective coating material comprising a synthetic hydrocarbon resin produced from a mixture of unsaturated hydrocarbons including an olefine and a diolefine in the presence of a metallic halide catalyst, the resin having an iodine value in excess of 175, being substantially completely soluble in benzene and in gasoline and substantially completely insoluble in alcohol and in acetone.

8. In the manufacture of a coating material comprising an unsaturated synthetic hydrocarbon resin, the method which comprises reacting together unsaturated hydrocarbons in the presence of a metallic halide catalyst to produce an unsaturated hydrocarbon polymerization resin having an iodine value of at least approximately 175, and combining said unsaturated hydrocarbon polymerization resin with a drying oil to produce a coating material.

9. A protective coating material comprising a synthetic hydrocarbon resin produced from a cracked petroleum distillate containing olefines and diolefines and in the presence of a metallic halide catalyst, to produce an unsaturated hydrocarbon polymerization resin having an iodine value of at least approximately 175, and combining said unsaturated hydrocarbon polymerization resin with a drying oil to produce a coating material.

10. A protective coating composition comprising a petroleum hydrocarbon solvent and a gasoline-soluble resinous hydrocarbon polymer formed by polymerization of a fraction of cracked petroleum distillate, said resin being soluble in benzene and gasoline but insoluble in alcohol and acetone, the composition having the property of forming a film upon evaporation of the solvent, which upon baking at 120° C. for an hour, can withstand immersion in gasoline for one hour.

11. A protective coating material comprising a hydrocarbon resinous polymerization product having the property of drying similar to that of so-called drying oil produced from cracked petroleum distillate, said resinous polymerization product having an iodine value of not substantially less than 175, and having the property of air drying or baking in film form to produce a film which can stand immersion in gasoline.

12. A protective coating composition comprising a volatile petroleum hydrocarbon solvent having dissolved therein a synthetic hydrocarbon resinous polymer obtained by polymerization of a mixture of hydrocarbons including olefines and diolefines, present in a cracked petroleum fraction, the resin having an iodine value of not substantially less than 175 and being substantially completely soluble in benzene and in gasoline and substantially completely insoluble in alcohol and in acetone, the composition having the property of forming a film upon evaporation of the solvent, which upon baking at 120° C. for an hour, can withstand immersion in gasoline for one hour.

13. In the manufacture of a coating material comprising an unsaturated synthetic hydrocarbon resin, the method which comprises reacting together unsaturated hydrocarbons present in cracked petroleum distillate to produce an unsaturated resinous hydrocarbon polymerization product having an iodine value of not substantially less than 175, and combining said unsaturated resinous hydrocarbon polymerization product with a drying oil to produce a coating material.

14. In the manufacture of a coating material comprising an unsaturated hydrocarbon resin, the method which comprises reacting together unsaturated hydrocarbons in the presence of a metallic halide catalyst added in chemically uncombined form, in a proportion not greater than approximately 0.5 gram of catalyst per 100 cc. of unsaturated hydrocarbons, to produce an unsaturated hydrocarbon resinous polymerization product having an iodine value of not substantially less than 175, and combining said resinous polymerization product with a drying oil to produce a coating material.

15. A protective coating material comprising a resinous hydrocarbon polymerization product produced from a liquid fraction of cracked petroleum distillate, said polymerization product having an iodine value of not substantially less than 175.

16. A protective coating material comprising a volatile petroleum hydrocarbon solvent vehicle having dissolved therein an anhydrous synthetic hydrocarbon resin formed by polymerization in the presence of aluminum chloride of a cracked petroleum distillate rich in olefine and diolefine resin forming components, said resin having an iodine value of not substantially less than 175, being substantially completely soluble in benzol and gasoline, and substantially completely insoluble in alcohol and acetone.

17. A protective coating material comprising a volatile petroleum hydrocarbon solvent vehicle having dissolved therein the reaction product of a drying oil with an anhydrous synthetic hydrocarbon resin formed by polymerization, in the presence of aluminum chloride of a cracked petroleum distillate rich in olefine and diolefine resin forming components, said resin having an iodine value of not substantially less than 175, and being substantially completely soluble in benzol and gasoline, and substantially completely insoluble in alcohol and acetone.

18. A protective coating composition comprising a petroleum hydrocarbon solvent and a gasoline-soluble reaction product dissolved therein, consisting of China-wood oil and a resinous hydrocarbon polymerization product obtained from a cracked petroleum distillate, rich in olefine and diolefine resin forming components, said hydrocarbon polymer having an iodine value of not substantially less than 175, and being completely soluble in benzol and in gasoline, and substantially completely insoluble in alcohol and in acetone.

CHARLES A. THOMAS.